United States Patent Office 3,504,017
Patented Mar. 31, 1970

3,504,017
POLYFUNCTIONAL CARBONYL NITRILE OXIDES
David S. Breslow, Madelyn Gardens, Del., assignor to Hercules Incorporated, Wilmington, Del., a corporation of Delaware
No Drawing. Filed Oct. 4, 1966, Ser. No. 584,113
Int. Cl. C07c 101/04
U.S. Cl. 260—482                    2 Claims

ABSTRACT OF THE DISCLOSURE

The disclosed compounds are polyfunctional carbonyl nitrile oxides and their polyfunctional carbonylhydroximoyl halide and carbonyl nitrolic acid precursors. A representative compound is 4,4'-oxy-bis(benzoyl carbonitrile N-oxide), which may be generated from 4,4'-oxy-bis-(phenylglyoxylohydroximoyl chloride), melting point 189–190° C. The compounds are useful as cross-linking agents for unsaturated polymers.

---

This invention relates to polyfunctional carbonylnitrile N-oxides and their carbonyl hydroximoyl halide and carbonyl nitrolic acid precursors as new compositions of matter.

In accordance with this invention, a new class of nitrile oxides has been discovered, namely, polyfunctional carbonylnitrile oxides having the general formulae:

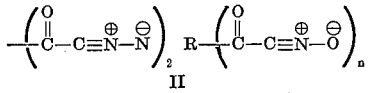

or

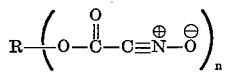

where R is any organic radical inert to the carbonyl nitrile oxide groups, as for example, where R is an alkylene, cycloalkylene, arylene, aralkylene, alkarylene, alkylenediarylene, cycloalkylene-diakylene, arylene-dialkylene, etc. radical such as methylene, ethylene, trimethylene, tetramethylene, pentamethylene, decamethylene, phenylene, naphthylene, biphenylene, anthrylene, cyclohexylene, phenylethylene, xylylene, phenylenedimethylene, methylenediphenylene, ethylenediphenylene, cyclohexylenedimethylene, etc., or an alkylene-oxy-alkylene, arylene-oxy-arylene, alkarylene-oxy-arylene, alkarylene-oxy-alkarylene, aralkylene-oxy-alkylene, aralkylene-oxy-aralkylene, or the corresponding thio radicals, such as methylene-oxy-methylene, ethylene-oxy-ethylene, phenylene-oxy-phenylene, methylenephenylene-oxy-phenylenemethylene, phenylenemethylene-oxy-methylenephenylene, ethylene - thioethylene, phenylene-thio-phenylene, phenylene-methylenethio-methylenephenylene, etc., and sulfones, such as ethylene-sulfonyl-ethylene, m - bis(methylenesulfonyl) phenylene, etc., and n is an integer greater than 1. The maximum value for n will, of course, be dependent on the number of carbon atoms in R, since the value of n cannot exceed the valence of R. Preferably, n will be an integer of from 2 to 10.

Exemplary of these polyfunctional carbonyl nitrile oxides are oxalyl bis(carbonitrile N-oxide), malonyl bis-(carbonitrile N-oxide), succinyl bis(carbonitrile N-oxide), adipyl bis(carbonitrile N-oxide), sebacyl bis(carbonitrile N-oxide), 1,2,3-propane tris(carbonyl carbonitrile N-oxide), 1,2,4-pentane tris(carbonyl carbonitrile N-oxide), 1,4-cyclohexane bis(carbonyl carbonitrile N-oxide), p-phenylene bis(acetyl carbonitrile N-oxide), 2,2'-thia-bis-(acetyl carbonitrile N-oxide), 3,3'-thia-bis(propionyl carbonitrile N-oxide), isophthalyl carbonitrile N-oxide, terephthalyl carbonitrile N-oxide, 4,4'-bis(benzoyl carbonitrile N-oxide), 4,4'-methylene-bis(benzoyl carbonitrile N-oxide), 4,4'-oxy-bis(benzoyl carbonitrile N-oxide), 3,3'-thia-bis(benzoyl carbonitrile N-oxide), the ethylene glycol, tetramethylene glycol, hexamethylene glycol, 1,4-cyclohexene glycol, resorcinol, 4,4'-dihydroxybiphenylene, isopropylidene-4,4'-bisphenol, etc. esters of carboxy carbonitrile N-oxide, polymers containing pendant carbonitrile N-oxide groups, as for example, ethylene-acrylic acid copolymers and partially hydrolyzed poly(alkyl acrylate) where two or more of the pendant carboxyl groups have been converted to carbonyl carbonitrile N-oxide groups, etc.

The precursors of these new polyfunctional carbonyl nitrile oxides are likewise new compounds and have the following general formulae:

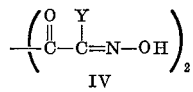

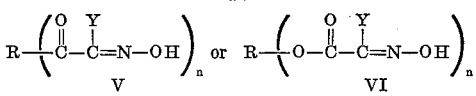

where R and n are the same as defined above and Y is halogen, i.e., fluorine, chlorine, bromine, or iodine, or nitro ($-NO_2$).

These polyfunctional carbonylhydroximoyl halides and carbonyl nitrolic acids are readily converted to the corresponding nitrile N-oxide by treatment with an alkaline material, such as a tertiary amine, an alkali or alkaline earth metal carbonate, hydroxide, carboxylate, or alkoxide, an alkaline earth metal oxide, or zinc oxide, etc.

Thus the new polyfunctional carbonyl compounds of this invention will have one of the following formulae:

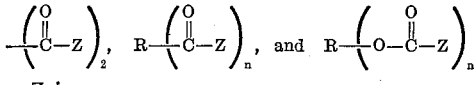

where Z is

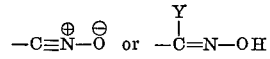

where Y is halogen or $-NO_2$, and R is a hydrocarbon radical, hydrocarbon-oxy-hydrocarbon radical, hydrocarbon-thio-hydrocarbon radical, or hydrocarbon-sulfonyl-hydrocarbon, and n is an integer greater than 1

The new polyfunctional carbonyl hydroximoyl halides having Formulas IV and V where Y is halogen can be prepared from poly(haloacetyl) compounds. The latter haloketones are readily produced by the reaction of a poly(acyl halide) with diazomethane to yield a poly (diazoketone), which in turn, on treatment with hydrogen halide, yields the desired poly(haloacetyl) compound. Exemplary of the acid halides that can be so converted to such poly(haloketones) are comounds having the formula $XCO(CH_2)_mCOX$ where X is halogen and m is 0 to 10 or higher such as the acid halides of oxalic acid, malonic acid, succinic acid, adipic acid, sebacic acid, etc., and other aliphatic, cycloaliphatic and aromatic poly(acyl halides) such as 1,2,3-propanetricarboxylic acid, 1,2,4-pentanetricarboxylic acid, 1,4 - cyclohexanedicarboxylic acid, 2 - carboxyl - 2 - methyl - cyclohexaneacetic acid, ethylene-acrylic acid copolymer, a partially hydrolyzed poly(alkyl acrylate), diglycollic acid, p-phenylenediacetic acid, thiodiacetic acid, thiodipropionic acid, 4,4'-sufonyl-dibutylric acid, phthalic acid, terephthalic acid, 4,4'-biphenyl dicarboxylic acid, trimellitic acid, trimesic acid, naphthalic acid, etc.

Poly(haloacetyl) compounds wherein the haloacetyl groups are directly attached to an aromatic nucleus can also be prepared by introducing two or more haloacetyl groups by means of a normal Friedel-Crafts reaction. Another method is to chlorinate or brominate a polyacetyl aromatic compound in which reaction one chlorine or bromine is introduced into each methyl group. Typical of the poly(haloacetyl) compounds that can be prepared by one or more of these procedures are 1,4-bis(chloroacetyl)benzene, 1,3,5 - tris(chloroacetyl)benzene, 4,4' - bis(bromoacetyl)biphenyl, 1,5 - bis(chloroacetyl)naphthalene, 4,4' - bis(chloroacetyl)diphenyl ether, chloroacetylated polystyrene, etc.

The haloketone compounds are then converted to the hydroximoyl halides by reaction with an alkyl nitrite and hydrogen halide under anhydrous conditions. Instead of an alkyl nitrite, other nitrosating agents can be used, as for example, $N_2O_3$, nitrosyl chloride, etc. An alternative procedure for preparing the hydroximoyl halides having the Formula V is to nitrostate an aliphatic or aromatic polyketone to produce a poly(oximinoketone) which on halogenation yields the poly(carbonyl hydroximoyl halide).

The polyfunctional carbonyl nitrolic acids having the Formula V where Y is $-NO_2$ can be prepared by the reaction of a polyketone with $N_2O_4$ which yields the poly (carbonyl nitrolic acid) directly.

The polyfunctional carbonyl hydroximoyl halides and carbonyl nitrolic acids represented by Formula VI above are derived from esters. The carbonyl hydroximoyl halides having Formula VI where Y is halogen can be prepared by reaction of an amino ester with sodium nitrite and hydrogen halide to form a diazo ester followed by conversion of the diazo ester with nitrous acid and hydrogen halide to the hydroximoyl halide. Thus, for example, with glycine or one of its precursors, such as aminoacetonitrile, it is possible to prepare a wide variety of glycinate esters from diols, triols, etc., which can be converted by this route to the polyfunctional carbonyl hydroximoyl halides. The carbonyl nitrolic acids having Formula VI where Y is $-NO_2$ can be prepared from beta-ketoesters. For example, acetoacetic acid esters can be readily prepared by the reaction of diketene with polyols and then nitrosating the beta-ketoester with aqueous nitrous acid to yield the corresponding oximinoketoester. Treatment of these compounds with nitric acid gives the nitrolic acid in excellent yield and treatment of the nitrolic acid with hydrogen chloride then yields the hydroximoyl chloride. Actually, the reaction can be carried out in one step by reacting the oximinoketoester with a mixture of nitric and hydrochloric acids to yield the hydroximoyl chloride directly.

As pointed out above, the carbonyl hydroximoyl halides and carbonyl nitrolic acids having Formula IV, V or VI above are readily converted to the corresponding carbonylnitrile N-oxides having Formula I, II or III by treatment with an alkaline material. Because these carbonylnitrile N-oxides are generally unstable at room temperature and above, if the pure compound is desired, it is necessary to isolate it at low temperature, usually in the order of $-20°$ C. or below. Accordingly, for most uses, the nitrile oxide will be generated in situ, as for example, in cross-linking reactions, as will be demonstrated below.

The following examples illustrate the preparation of the polyfunctional carbonyl nitrile oxides and their precursors. All parts and percentages are by weight unless otherwise indicated.

EXAMPLE 1

A suspension of 32.3 parts of 4,4'-bis(chloroacetyl)diphenyl ether in 175 parts of diethyl ether was stirred and saturated with dry hydrogen chloride. Then, while slowly passing in hydrogen chloride, 42 parts of isoamyl nitrite of 70% purity was added in small increments with stirring. The solids dissolved as the nitrite was added and a clear solution was obtained. The solid, which formed on standing overnight at room temperature, was filtered off. The filtrate was evaporated to dryness, the resulting mixture of solid and liquid was filtered and the solid was washed with a small amount of ether. The combined solids amounted to 31.8 parts, which is an 83% yield. The crude product had a melting point of 188° C. On recrystallization from ether and pentane, it had a melting point of 189–190° C. The 4,4'-oxybis(phenylglyoxylohydroximoyl chloride) so obtained has the formula

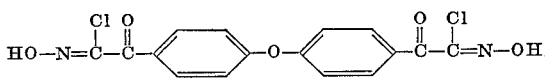

On analysis, it was found to contain 50.6% C; 2.90% H; 7.71% N; and 18.2% Cl. Theory for $C_{16}H_{10}Cl_2N_2O_5$ is 50.4% C; 2.64% H; 7.35% N; and 18.6% Cl.

EXAMPLE 2

A solution of 30 parts of 1,8-dibromo-2,7-dioxooctane in 140 parts of diethyl ether was cooled in an ice bath and saturated with dry hydrogen bromide. To the cooled solution was added 29 parts of isoamyl nitrite in small increments. The reaction mixture was allowed to stand overnight at room temperature. The ether was then evaporated and the residue was recrystallized from carbon tetrachloride. The adipoyl-bis(N-hydroxy formimidoyl bromide) so prepared has the formula:

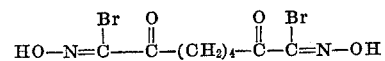

On analysis, it was found to contain 27.0% C; 2.92% H; 7.50% N; and 44.4% Br. Theory for $C_8H_{10}N_2O_4Br_2$ is 26.8% C; 2.81% H; 7.83% N; and 44.6% Br.

EXAMPLE 3

Tetramethylene glycol was reacted with glycinyl chloride hydrochloride to prepare the bis(glycinate ester). A solution of 69.5 parts of this ester in 95 parts of water was cooled in an ice-salt bath and 35 parts of concentrated hydrochloric acid was added. To the chilled solution was then added, in small increments, a solution of 34.5 parts of sodium nitrite in 50 parts of water. The addition of hydrochloric acid and sodium nitrite was then repeated. The white solid which precipitated was filtered off, washed with water, dried, and then was recrystallized from a benzene-hexane mixture. The tetramethylene bis(ester) of oxalomonohydroximoyl chloride so obtained has the formula:

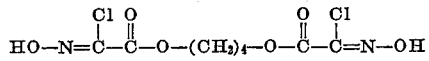

On analysis, it was found to contain 32.0% C; 3.49% H; 9.04% N; and 23.2% Cl. Theory for $C_8H_{10}N_2Cl_2O_6$ is 31.9% C; 3.35% H; 9.31% N; and 23.6% Cl.

EXAMPLE 4

A suspension of 8.3 parts of bis(4-chloroacetylphenyl)methane (melting point of 122.5–124.5° C.) in 50 parts of dioxane was stirred, saturated with hydrogen chloride, and 7.75 parts of isoamyl nitrite (98.6% pure) was added in small increments. The reaction mixture was then stirred with activated carbon, filtered, the diluent stripped off and the residue was washed with hot carbon tetrachloride. The cream-colored, solid product so obtained amounted to 7.07 parts, an 84.8% yield. On recrystallization from ether-hexane it had a melting point of 171–172° C. (d). The 4,4'-methylenebis(phenylglyoxylohydroximoyl chloride) so produced has the formula

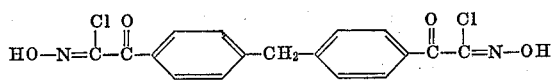

On analysis, it was found to contain 7.47% N; and 18.4% Cl. Theory for $C_{17}H_{12}N_2O_4Cl_2$ is 7.39% N; and 18.7% Cl.

EXAMPLE 5

A suspension of 15.3 parts of 4,4'-bis(chloroacetyl) biphenyl, having a melting point of 230–231.5° C., in 250 parts of dioxane was sparged with hydrogen chloride and 29.7 parts of isoamyl nitrite (98.6% pure) was added in small increments. The reaction mixture was then sparged with nitrogen and the diluent was stripped off. The residue was recrystallized from dioxane-hexane and then from ethyl acetate. The 4,4'-bis(phenylglyoxylohydroximoyl chloride) so obtained amounted to 12.87 parts (76.8% yield) and had a melting point of 214° C. (d.). It has the formula

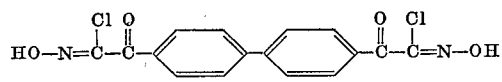

On analysis, it was found to contain 53.0% C; 2.95% H; 7.70% N; and 19.4% Cl. Theory for $C_{16}H_{10}N_2O_4Cl_2$ is 52.6% C; 2.76% H; 7.67% N; and 19.4% Cl.

EXAMPLE 6

A mixture of 11.5 parts of ethylene bis(acetoacetate) and 115 parts of 25% nitric acid was cooled and 7.2 parts of finely ground sodium nitrite was added. The mixture was then warmed to 30–40° C., maintained there for 15 minutes, and poured onto ice. The product was separated and recrystallized from ether. The ethylene bis(ester) of carboxynitrolic acid so obtained has the formula

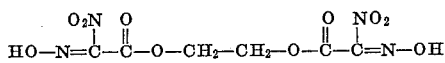

Analysis for nitrogen showed it to contain 19.2%. Theory for $C_6H_6N_4O_{10}$ is 19.0% nitrogen.

As pointed out above, the polyfunctional carbonyl nitrile N-oxides of this invention are useful as cross-linking agents for unsaturated polymers. Any polymer containing ethylenic unsaturation wherein there is at least one hydrogen radical attached to at least one of the carbon atoms of the ethylenic double bond, can be cross-linked with the instant polyfunctional nitrile N-oxides, in accordance with this invention. Among the polymers which can be cross-linked in this manner are polybutadiene - 1,2; polybutadiene - 1,4; styrene - butadiene copolymers; butyl rubber (polyisobutylene-isoprene copolymers); natural rubber; polyester resins such as, for example, maleate containing polyesters; butadiene - acrylonitrile copolymers; ethylene - propylene-dicyclopentadiene terpolymers; polychloroprene; polyisoprene; alkyd resins such as, for example, tall oil alkyd resins; polyether copolymers and terpolymers containing at least one unsaturated epoxide constituent such as, for example, propylene oxide-allyl glycidyl ether copolymers and ethylene oxide - epichlorohydrin - allyl glycidyl ether terpolymers; and the like. Polymers containing acetylenic unsaturation can also be cross-linked by the instant process. Mixtures or blends of two or more of such unsaturated polymers may also be cross-linked by the instant process.

The cross-linking reaction is carred out by contacting the unsaturated polymer with a minor amount of the polyfunctional carbonyl nitrile oxide, the amount of the latter depending on the degree of cross-linking desired. Generally, an amount of the nitrile oxide of from about 0.01%, and preferably 0.1%, up to about 10% by weight of the polymer will be used. Any means can be used for intimately contacting the unsaturated polymer with the polyfunctional carbonyl nitrile N-oxide. Because of the instability of these carbonyl nitrile oxides at ordinary temperatures, it is usually preferable to generate the nitrile oxide in situ. This is readily achieved by mixing a precursor of the polyfunctional carbonyl nitrile oxide, such as its hydroximoyl chloride or nitrolic acid, with the unsaturated polymer and then treating the mixture with an alkaline material, whereby the nitrile oxide is generated in situ and then cross-links the polymer. The cross-linking reaction can be carried out over a wide temperature range, with a temperature of from about −20° C. to about 150° C. generally being used, and preferably the temperature will be within the range of from about 0° C. to about 100° C.

The following examples demonstrate the generation of the polyfunctional carbonyl nitrile N-oxides from their precursors and the cross-linking of unsaturated polymers thereby.

EXAMPLE 7

To a solution of 1 part of an unsaturated polyester, prepared by the reaction of a mixture of maleic and phthalic anhydrides with hydroxyethylated bisphenol, in 5 parts of ethyl acetate was added 0.1 part of the 4,4'-oxybis(phenylglyoxylohydroximoyl chloride) prepared in Example 1. The solution was stirred and 0.05 part triethylamine was added. The solution immediately turned cloudy and gelled within 30 minutes.

EXAMPLE 8

Example 7 was repeated except that 0.1 part (10 drops) of 10% aqueous sodium carbonate was used instead of the triethylamine. Again, the solution gelled within a short time.

EXAMPLE 9

Example 7 was repeated except that the unsaturated polyester was dissolved in 5 parts of dioxane and 0.2 part of the 4,4' - methylenebis(phenylglyoxylohydroximoyl chloride) prepared in Example 4 was used. The solution was stirred and 0.1 part of triethylamine was added. The reaction mixture was completely gelled within 15 minutes.

EXAMPLE 10

Example 7 was repeated except that 0.2 part of the tetramethylene bis(ester) of oxalomonohydroximoyl chloride prepared in Example 3 was used as the cross-linker and 0.1 part of triethylamine was added. The reaction mixture gelled within 30 minutes.

EXAMPLE 11

Twenty parts of low molecular weight styrene-butadiene-rubber, having a molecular weight of about 2000 and containing approximately 66% styrene, 3.5 parts of the 4,4'-bis(phenylglyoxylohydroximoyl chloride) prepared in Example 5, 10 parts of carbon black, 5 parts of di(octyl)-phthalate, 3 parts of anhydrous barium oxide, and 200 parts of anhydrous tetrahydrofuran were milled in a ball mill under nitrogen for 16 hours. The solvent was removed from the fine suspension under reduced pressure at room temperature to yield a creamy paste. Strips 1 x 4 x ⅛ inch were cast and allowed to cure at room temperature in the open atmosphere. After several days, the strips had cured integrally to a medium hard rubber, which was insoluble in acetone, methyl isobutyl ketone and in methylene chloride.

EXAMPLE 12

Example 7 was repeated except that 0.1 part of the adipyl-bis(n-hydroxy formimidoyl bromide) prepared in Example 2 was used as the cross-linker. Again, rapid gellation took place on addition of the triethylamine.

What I claim and desire to protect by Letters Patent is:

1. As a new composition of matter a polyfunctional carbonyl compound having the formula $$R\left(O-\overset{O}{\underset{\|}{C}}-Z\right)_n$$

where Z is $$-C\equiv N^{\oplus}-O^{\ominus} \text{ or } -\overset{Y}{\underset{|}{C}}=N-OH$$

where Y is halogen or $-NO_2$, R is selected from the group of hydrocarbon radicals, hydrocarbon-oxyhydrocarbon radicals, hydrocarbon-thio-hydrocarbon radicals, and hydrocarbon-sulfonyl-hydrocarbon radicals and $n$ is an integer greater than 1.

2. The composition of claim 1 having the formula $$R\left(O-\overset{O}{\underset{\|}{C}}-\overset{Cl}{\underset{|}{C}}=N-OH\right)_2$$

where R is alkylene.

References Cited

UNITED STATES PATENTS

| | | | |
|---|---|---|---|
| 2,320,234 | 5/1943 | Hartung et al. | 260—566 |
| 3,148,193 | 9/1964 | Gilbert | 260—566 XR |
| 3,211,742 | 10/1965 | Lenaers | 260—482 XR |
| 3,218,331 | 11/1965 | Eloy | 260—482 XR |

LORRAINE A. WEINBERGER, Primary Examiner

P. J. KILLOS, Assistant Examiner

U.S. Cl. X.R.

260—479, 566, 570.1, 583, 584